(12) United States Patent
Vaudreuil et al.

(10) Patent No.: US 11,703,895 B2
(45) Date of Patent: Jul. 18, 2023

(54) SYSTEM AND METHOD FOR MONITORING HOT WATER SUPPLY IN A LOAD CONTROL NETWORK

(71) Applicant: Mosaic Power, LLC, Frederick, MD (US)

(72) Inventors: Gregory Vaudreuil, Frederick, MD (US); Vasiliy Mironenko, Baltimore, MD (US)

(73) Assignee: MOSAIC POWER, LLC, Frederick, MD (US)

( * ) Notice: Subject to any disclaimer, the term of this patent is extended or adjusted under 35 U.S.C. 154(b) by 927 days.

(21) Appl. No.: 16/452,655

(22) Filed: Jun. 26, 2019

(65) Prior Publication Data

US 2019/0391606 A1    Dec. 26, 2019

Related U.S. Application Data

(60) Provisional application No. 62/689,908, filed on Jun. 26, 2018.

(51) Int. Cl.
*F24H 1/00*    (2022.01)
*F24H 9/20*    (2022.01)
*F24D 19/10*    (2006.01)
*G05D 23/30*    (2006.01)

(52) U.S. Cl.
CPC ....... *G05D 23/303* (2013.01); *F24D 19/1051* (2013.01); *F24H 1/0018* (2013.01); *F24H 9/2014* (2013.01); *F24H 2250/02* (2013.01)

(58) Field of Classification Search
None
See application file for complete search history.

(56) References Cited

U.S. PATENT DOCUMENTS

| | | | | |
|---|---|---|---|---|
| 2,375,722 A | * | 5/1945 | Woodworth | ...... H02J 13/00007 340/310.17 |
| 2,641,716 A | * | 6/1953 | Hyer | ......... H02J 3/14 307/35 |
| 4,467,434 A | * | 8/1984 | Hurley | ......... G01R 21/08 324/103 R |
| 4,874,926 A | * | 10/1989 | Sanders | ......... G05D 23/275 219/486 |

(Continued)

OTHER PUBLICATIONS

International Search Report issued in corresponding International Patent Application No. PCT/US19/39318 dated Sep. 19, 2019.

*Primary Examiner* — Thor S Campbell
(74) *Attorney, Agent, or Firm* — Gregory M. Stone; Whiteford, Taylor & Preston, LLP

(57) ABSTRACT

Disclosed is a system and method for monitoring hot water supply in a load control network, and more particularly for ensuring that there is sufficient hot water available for a customer participating in a demand response program that uses, at least in part, water heaters as a component of the demand response program. A multi-meter that is external to the water heater is used to monitor an electrical power supply circuit on the water heater, to report preferably volts, amps, and power factor of the water heater. The multi-meter may use these measured values to, in turn, determine a current charge state of the water heater and thus ensure maintenance of an adequate supply of hot water, even in times of demand response curtailment.

16 Claims, 1 Drawing Sheet

(56) References Cited

U.S. PATENT DOCUMENTS

| | | | | |
|---|---|---|---|---|
| 4,888,495 A * | 12/1989 | Feron | | H02J 3/14 307/35 |
| 5,289,362 A * | 2/1994 | Liebl | | G05D 23/1923 705/412 |
| 5,311,068 A * | 5/1994 | Miller | | G01R 21/133 307/119 |
| 5,345,225 A * | 9/1994 | Davis | | G08B 21/185 340/653 |
| 5,572,438 A * | 11/1996 | Ehlers | | H02J 13/00004 307/37 |
| 5,956,462 A * | 9/1999 | Langford | | G05D 23/1923 307/38 |
| 6,363,218 B1 * | 3/2002 | Lowenstein | | H05B 1/0283 392/498 |
| 9,188,363 B2 * | 11/2015 | Buescher | | H02J 3/14 |
| 9,927,131 B2 * | 3/2018 | Rognli | | F24D 19/1063 |
| 9,933,184 B2 * | 4/2018 | Lesage | | H05B 3/04 |
| 10,054,319 B2 * | 8/2018 | Rimpler | | F24H 9/1818 |
| 10,168,073 B2 * | 1/2019 | Harbin, III | | F24D 19/1051 |
| 10,840,735 B1 * | 11/2020 | Cooper | | H02J 13/00004 |
| 10,879,727 B1 * | 12/2020 | Cooper | | H02J 9/062 |
| 10,934,654 B1 * | 3/2021 | Farris | | G05B 9/02 |
| 11,183,843 B1 * | 11/2021 | Cooper | | H02J 13/00004 |
| 11,287,144 B2 * | 3/2022 | Porwal | | F24D 19/1081 |
| 2001/0010032 A1 * | 7/2001 | Ehlers | | G05B 19/042 702/62 |
| 2004/0075343 A1 * | 4/2004 | Wareham | | H02J 3/14 307/39 |
| 2007/0043478 A1 * | 2/2007 | Ehlers | | F24F 11/30 700/276 |
| 2007/0175883 A1 | 8/2007 | Miu et al. | | |
| 2007/0222295 A1 * | 9/2007 | Wareham | | H02J 13/00004 307/32 |
| 2008/0177678 A1 * | 7/2008 | Di Martini | | G06Q 10/06 705/412 |
| 2009/0105888 A1 | 4/2009 | Flohr et al. | | |
| 2010/0004790 A1 * | 1/2010 | Harbin, III | | G05D 23/1923 709/219 |
| 2010/0083356 A1 * | 4/2010 | Steckley | | H04L 12/2834 726/5 |
| 2011/0130887 A1 | 6/2011 | Ehlers, Sr. | | |
| 2012/0001487 A1 * | 1/2012 | Pessina | | H05B 47/11 307/31 |
| 2012/0091213 A1 * | 4/2012 | Altonen | | H05B 47/11 236/51 |
| 2012/0091804 A1 * | 4/2012 | Altonen | | H04L 12/413 307/31 |
| 2012/0095601 A1 * | 4/2012 | Abraham | | H04L 12/2816 713/320 |
| 2013/0113284 A1 * | 5/2013 | Altonen | | E06B 9/68 307/31 |
| 2013/0299600 A1 * | 11/2013 | Beckers | | F24H 9/2021 219/490 |
| 2015/0295402 A1 * | 10/2015 | Black | | G05B 15/02 700/291 |
| 2016/0178239 A1 | 6/2016 | Thornton et al. | | |
| 2016/0204607 A1 | 7/2016 | Rogers, Jr. et al. | | |
| 2016/0216007 A1 * | 7/2016 | Harbin, III | | H02J 13/00034 |

\* cited by examiner

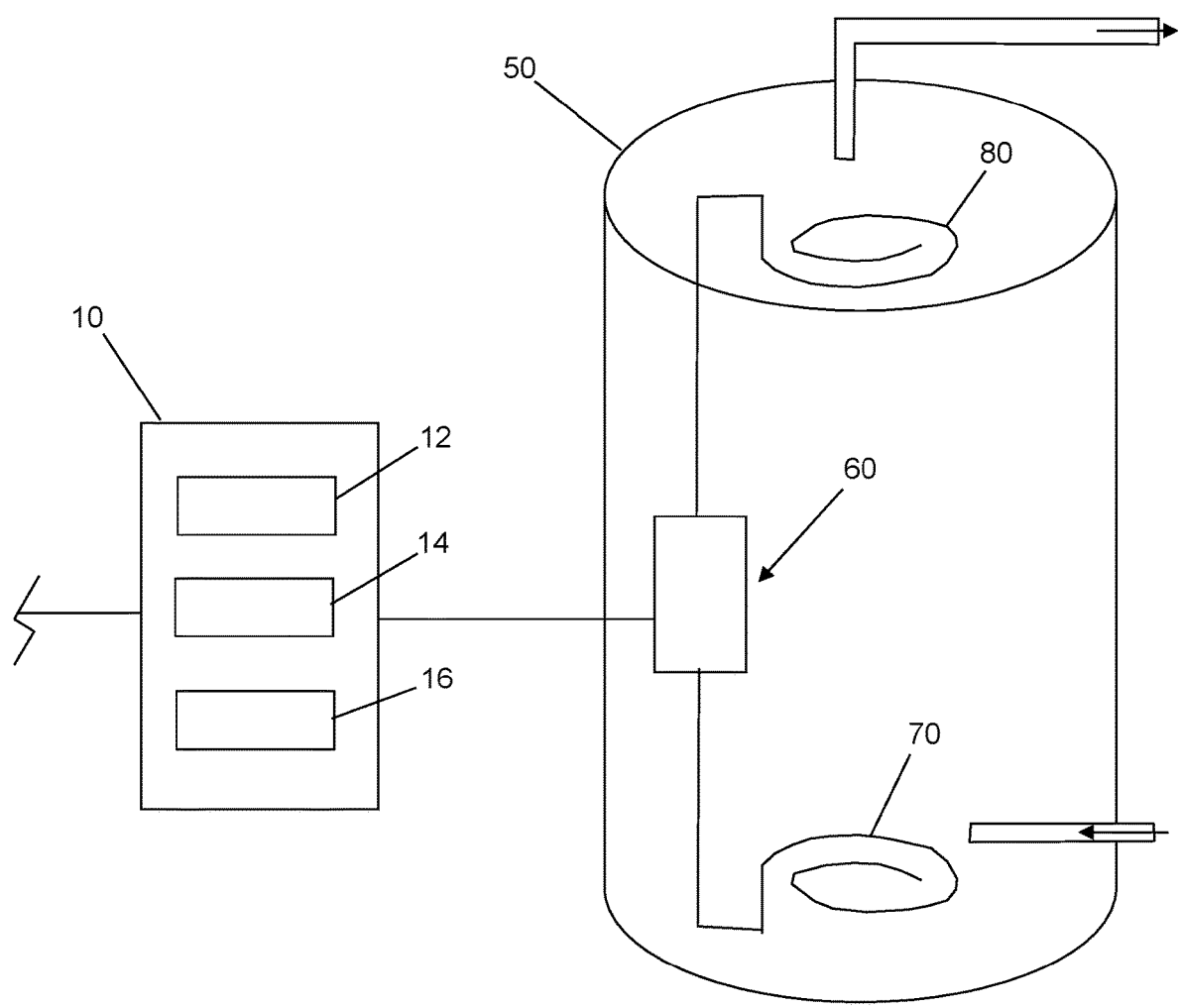

SYSTEM AND METHOD FOR MONITORING HOT WATER SUPPLY IN A LOAD CONTROL NETWORK

CROSS REFERENCE TO RELATED APPLICATION

This application claims the benefit of U.S. Provisional Application No. 62/689,908 titled "System and Method for Monitoring Hot Water Supply in a Load Control Network," filed Jun. 26, 2018 by the inventors herein, which application is incorporated herein by reference in its entirety.

FIELD OF THE INVENTION

The current invention relates to regulation of a demand response electrical supply network, and more particularly to systems and methods for controlling demand response curtailment instructions at a power consuming device, such as an electric water heater.

BACKGROUND

In an effort to better match energy use with energy supply, electric system planners and operators have implemented demand response programs, by which a consumer's consumption is regulated in a variety of ways in response to, for example, demand signals transmitted by the utility. Consumers may adjust their power demand, such as by delaying certain energy-consuming tasks or switching to alternative energy sources, in order to minimize use during high-demand times, or may pay higher energy rates during those high-demand times. Demand response programs thus provide consumers an opportunity to play a role in the operation of the electric grid by reducing or shifting their electricity usage during peak periods in response to time-based rates or other forms of financial incentives. Such programs can lower the cost of electricity in wholesale markets, and in turn, lead to lower retail rates. Methods of engaging customers in demand response efforts include offering time-based rates such as time-of-use pricing, critical peak pricing, variable peak pricing, real time pricing, and critical peak rebates. It also includes direct load control programs which provide the ability for power companies to, for example, cycle air conditioners, water heaters, and other appliances on and off during periods of peak demand in exchange for a financial incentive and lower electric bills. Unfortunately, such load control programs can also result in making the appliance unusable, or less than optimally usable, at times that are inconvenient for the customer. For example, a load control signal that cycles off a water heater may leave the customer without a supply of hot water when it is particularly needed.

Traditional efforts to mitigate this inconvenience have included providing a temperature measurement device inserted into the water heater to determine the temperature of water in the tank. However, such temperature measurement devices require that a technician access the interior of the water heater and physical modification of the tank system, requiring specialized plumbing skills, potential voiding of the water heater warranty, and repeating installation efforts when replacing a water heater. It would therefore be advantageous to provide a means for ensuring the ready availability of hot water from water heaters that are subject to demand response control signals, but that do not require physical modification of the water heater in order to ensure such ready supply.

SUMMARY OF THE INVENTION

Disclosed herein is a system and method configured to solve one or more of the problems associated with managing demand response control signals in a manner that ensures maintenance of quality of service to an end consumer. More particularly, a system and method are provided herein for monitoring hot water supply in a load control network that include a multi-meter that is external to a water heater and wired in series with such water heater in order to measure voltage, current, and power factor in the electrical power supply circuit of the water heater. This allows for the determination of which of the water heater's upper heating element and lower heating element is energized at a given time based on the measured voltage, current, and power factor values, which in turn may be used to either allow a demand response curtailment instruction to proceed (and thus stop supply of electrical power to the water heater), or prevent a demand response curtailment instruction from being carried out (and thus allow continued supply of electrical power to the water heater) to maximize quality of service to the user.

In accordance with certain aspects of an embodiment, a system for monitoring hot water supply in a load control network is disclosed, comprising: a multi-meter having an electrical supply input and an electrical supply output to an electrical power supply circuit of a water heater, the multi-meter further comprising: a voltage monitor configured to determine a voltage of the electrical power supply circuit; a current monitor configured to determine a current of the electrical power supply circuit; and a metering chip configured to determine which of an upper heating element of the water heater and a lower heating element of the water heater is presently energized based on one or more of the voltage of the electrical power supply circuit, the current of the electrical power supply circuit, and a power factor of the electrical power supply circuit.

In accordance with further aspects of an embodiment, a method for monitoring hot water supply in a load control network is disclosed, comprising the steps of: providing a multi-meter having an electrical supply input and an electrical supply output to an electrical power supply circuit of a water heater, the multi-meter further comprising: a voltage monitor configured to determine a voltage of the electrical power supply circuit; a current monitor configured to determine a current of the electrical power supply circuit; and a metering chip configured to determine which of an upper heating element of the water heater and a lower heating element of the water heater is presently energized based on one or more of the voltage of the electrical power supply circuit, the current of the electrical power supply circuit, and a power factor of the electrical power supply circuit; receiving at the multi-meter a present voltage in the electrical power supply circuit; receiving at the multi-meter a present current in the electrical power supply circuit; and determining at the multi-meter which of the upper heating element of the water heater and the lower heating element of the water heater is presently energized based on the present voltage and the present current.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

FIG. 1 is a schematic view of system for monitoring hot water supply in a load control network in accordance with certain aspects of an embodiment of the invention.

DETAILED DESCRIPTION OF THE PREFERRED EMBODIMENTS

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Disclosed herein is a system and method for monitoring hot water supply in a load control network, and more particularly (and in accordance with certain aspects of an embodiment of the invention) for ensuring that there is sufficient hot water available for a customer participating in a demand response program that uses, at least in part, water heaters as a component of the demand response program. As discussed in greater detail below, a multi-meter that is external to the water heater is used to monitor an electrical power supply circuit on the water heater, to report preferably volts, amps, and power factor of the water heater. The multi-meter may use these measured values to, in turn, determine a current charge state of the water heater and thus ensure maintenance of an adequate supply of hot water, even in times of demand response curtailment.

More particularly, and with reference to the schematic view of FIG. 1, an external multi-meter 10 may be used to determine which heating element of a water heater 50 is being powered. The multi-meter 10 is wired in series with an electrical power supply circuit 60 of the water heater 50, which electrical power supply circuit 60 energizes a lower heating element 70 and an upper heating element 80 in water heater 50. Multi-meter 10 may include a voltage monitor 12, a current monitor 14, and a metering chip 16 capable of determining the power factor of electrical power supply circuit 60, with metering chip 16 being configured to either allow or block execution of a demand response curtailment instruction issued by a power supplier to, in turn, maintain an optimal quality of service for the end user. Alternatively, metering chip 16 may be configured to make a determination of whether such demand response curtailment instruction is to be executed, and in turn communicate that determination to the power supplier or other entity that has authority to control such demand response curtailment instruction.

In accordance with a particular embodiment, in response to detecting that the top heating element 80 of water heater 50 is being powered, the system (such as metering chip 16) may determine that the water currently available in water heater 50 is colder than desired, and thus should not be subjected to a demand response curtailment instruction. Likewise, in response to detecting that the bottom heating element 70 is being powered, the system (such as metering chip 16) may determine that the water currently available in the water heater 50 is sufficiently hot, such that the water heater may safely be subjected to a demand response curtailment instruction without jeopardizing the ready supply of hot water.

In a water heater, the ability to draw hot water from the water heater at a time later than when it was heated is a form of energy storage. By delaying the time at which the cold water drawn into the water heater is reheated, the water heater remains in a lower energy state, which may be referred to as a lower state of charge. When the water in the water heater is fully reheated, the unit is in a higher energy state, which may be referred to as a higher state of charge. It is important to know the state of charge in order to ensure that there is sufficient hot water available for use while delaying to the maximum extent possible the time at which energy is consumed to reheat the water in the water heater.

A typical electric resistance-type water heater heats and stores hot water for later consumption. The tanks of such water heaters are generally designed to ensure that hot water is dispensed from the top of the heater, where the water is the hottest, and are filled with cold water from the bottom of the heater. In this way, the hot water, being less dense than the cold water, remains in the top of the heater, and the cold water remains in the bottom of the heater. A well-designed water heater will maintain a distinct and persistent thermocline, which is a small boundary layer between the hot and cold water. This is best understood by taking a long shower. The water remains hot until water around the thermocline is dispensed, where it transitions to warm and then quickly to cold.

When water is drawn from a conventional water heater, such as water heater 50 of FIG. 1, cold water flows into the bottom of the water heater. When a sufficient amount of cold water has entered the bottom of water heater 50, a thermostat sensing the lower portion of the tank will turn on lower heating element 70 to begin reheating. When a large amount of water is drawn from water heater 50, the thermocline rises and ultimately exposes the top thermostat to cold water. At that point, the top thermostat detects less than fully hot water and turns on the upper heating element 80 in the top of the tank of water heater 50. In the same action, the top thermostat turns power off to the bottom thermostat and lower heating element 70. In typical water heater configurations, the top thermostat ensures only one heating element can be energized at a time.

The two heating elements 70 and 80 of water heater 50 are discrete components that convert the flow of electricity into heat through resistance. In accordance with certain aspects of an embodiment of the invention, subtle variations in manufacturing, wear-and-tear, and field support may be used to detect a difference in the physical properties of the two heating elements 70 and 80, which difference is sufficient to discriminate between electric usage by upper heating element 80 and lower heating element 70.

More particularly, and in accordance with certain aspects of an embodiment of the invention, several physical properties of the heating elements 70 and 80 may be discovered through an external, high-quality electrical meter. A first such physical property is resistance—by measuring both the voltage and the current, the resistance of the heating elements 70 and 80 can be found using V=I*R, or V/I=R. (Voltage/Current=Resistance). In steady operation, changes in line voltage result in changes in current, but the relationship remains constant based on the resistance. As the top thermostat switches between the top heating element and the bottom heating element, the measured resistance will change, reflecting the varying physical properties of each element.

Likewise, another physical property of the heating elements 70 and 80 that may be discovered through an external electrical meter is the capacitance of the heating element. The heating element is composed of a thin wire that gets hot, embedded in a grounded outer casing and an insulating material that introduces capacitance. Because of manufacturing variability and wear and tear, the heating elements 70 and 80 exhibit different capacitances. Because water heaters use AC power, this capacitance impacts the flow of electricity relative to voltage. This shift results in a power factor that is less than 1, either with the current leading voltage, or current lagging voltage. As noted above, metering chip 16 of multi-meter 10 may determine the power factor by sampling and comparing the phase of the sinusoidal voltage and phase of the sinusoidal current.

In the event that the power factor of the two elements is too similar to be differentiated, a capacitor or inductor can be added across the terminals of the heating elements 70 and 80. This will introduce additional variation to one element to help distinguish it from the other.

In cases where there is a very large difference between the size of the heating elements 70 and 80, the difference (i.e., which heating element is currently being powered) can be determined solely by the instant power consumption.

Either of these techniques, and possibly others, may be used to distinguish between the upper heating element 80 and the lower heating element 70, to in turn determine which element is currently powered on. More particularly, without measurement beforehand, the usage pattern of a water heater makes it possible to identify which element is the upper heating element 80 and which is the lower heating element 70. Because cold water flows into the bottom of the tank, the lower heating element 70 is typically energized first. Moreover, when only a small to moderate amount of water is drawn, the upper heating element 80 may not turn on at all. Because of this, the lower heating element 70 is also energized for more total time. Given these operational characteristics, the heating element that turns on first, or the heating element that has the most usage, can be identified as the lower heating element 70.

When a water heater is turned off due to a demand management event, the full line power can be restored for short intervals to sample the above-described, distinct characteristics of the heating elements, to again determine whether the lower heating element 70 or upper heating element 80 is energized (and thus the availability of hot water in the water heater 50). This can be the full line power, or a lower voltage sufficient to measure the characteristics of the heating element currently selected by the thermostats.

Resistance changes due to temperature, such that a change in temperature of the water surrounding a heating element will change that element's resistance (although in a water heater, there is not much change in the small range of temperatures that is typically between 50 and 140 degrees F.). Conversely, determination of resistance of the heating element (i.e., through measurement of voltage and current external to the water heater as noted above) can be used, as discussed below, to determine temperature of the water at such element, and thus determine whether an element should be powered to ensure adequate supply of hot water.

It is envisaged that the temperature of the water may be determined directly from the resistance of the heating elements 70 and 80 themselves. More particularly, the heating elements 70 and 80 change resistance with temperature, which is a key characteristic of a thermistor. This property can be used to measure the temperature of the water in the vicinity of each of the heating elements 70 and 80 by passing a small sampling current to read the resistance of the respective heating element. That resistance can then be compared to a table relating temperature to resistance to determine the temperature. While each heating element 70 and 80 is different, and they are not known to be calibrated for this purpose in prior systems, such a table may be inferred by sampling the resistance of the heating elements 70 and 80 at known states as provided by the water heater's thermostat. When the thermostat is open, the water temperature is at the known thermostat setting. When the water heater 50 is fully discharged, the water temperature is at the inlet temperature, which can be sampled outside of the water heater 50.

The foregoing monitoring of the heating elements 70 and 80 in a water heater may be accomplished using multi-meter 10 wired in series with the water heater 50. In the exemplary configuration of FIG. 1, such multi-meter 10 is configured to determine and report volts, amps, and power factor in the electrical power supply circuit 60 of water heater 50. Further, and as mentioned above, multi-meter 10 may include metering chip 16 (such as by way of non-limiting example an integrated circuit model ADE7953, which is readily commercially available from Analog Devices of Norwood, Mass.), a separate current transformer, and support components to directly measure the voltage and current. Those of ordinary skill in the art will recognize that metering chip 16 may take a variety of other forms, as long as such processing element is capable of performing the functions described herein. Metering chip 16 computes from those two measures a variety of attributes of the electrical power being measured, as follows:

1. First, the resistance and/or capacitance values of the heating elements 70 and 80 may be determined based on a series of readings taken over a period of time. Noise is separated from the sample stream using conventional data processing techniques known to those skilled in the art, and the samples are characterized into a distribution. Properly cleaned and using mathematical processing techniques well-known to those skilled in the art, such data may form a bi-modal distribution having two discrete mathematical modes—one corresponding to the upper heating element 80 of the water heater 50, and one corresponding to the lower heating element 70 of the water heater 50. This sampling of data can be done over any period of time that is significant enough to have usage by both the upper heating element 80 and the lower heating element 70 of the water heater 50.

2. Next, a determination is made of which mode represents the upper heating element 80 and which mode represents the lower heating element 70 by evaluating the number of samples around each mode over a sufficiently long interval. Fundamentally, a confidence interval is computed using well-known statistical analysis methods around each mode to determine if the differences between the modes are significant. Once the two distinct modes are found, the mode associated with the higher number of total samples is identified as the lower heating element 70.

3. It is possible that during such sampling period, the upper heating 80 element does not turn on at all, such that there may be only one mode. Such a case may occur, for example, with a vacant home, which would have an idle water heater. An idle water heater has a distinct pattern of regular usage associated with rewarming after losing heat. This idle pattern comprises a consistent number of hours between a consistent amount of power consumed, with an average consumption over the interval of typically between 55-85 watts, which is a typical energy loss from an idle water heater.

4. Further, the lower heating element 70 of a water heater has a tendency to burn out after a few years. In such a case, there is again only a single mode, this time associated with the upper heating element 80. This can be distinguished by another distinct usage pattern. More particularly, when the lower heating element 70 is broken, only the upper heating element 80 is available for heating water. When energized, the upper heating element 80 only heats the water in the top of the tank, typically about 15 gallons; thus, only 15 gallons of hot water is available for use from the water heater. In this broken state, the water heater provides degraded service. More particularly in this state, a user drawing water from the water heater typically stops after 15 gallons have been drawn from the tank, as at that point the water coming from the water heater is cold. This results in a usage pattern in which the recurring maximum usage of only 15 gallons is significantly less than the full capacity of the water heater, which is predictive of the water in the bottom of the water heater being cold, and in turn, the lower heating element 70 having burned out. Thus, by recording episodes of heating from the time the water heater is not drawing power until it again does not draw power, maximum usage episodes associated with 15 gallons of water heating will indicate a broken bottom element.

5. During steady state operation, regular sampling of the distinct characteristics of the heating elements 70 and 80 is compared to the values determined and stored in step 1 above to determine whether the heater is using the upper heating element 80 and is colder than desired (and thus should not be subjected to a load control instruction to power down), or is more likely using the lower heating element 70 and is thus hot enough (indicating that the water heater could be subjected to a load control instruction to power down without jeopardizing service).

Using the foregoing system and method, and in accordance with certain aspects of a particular embodiment, a water heater 50 may be controlled in a load control environment without requiring that the water heater 50 be modified to include an invasive, internal thermostat, and instead may participate in a load control program simply through connection of a multi-meter 10 wired in series with the water heater 50 to determine the charge state of the water heater. Through monitoring and recording information relating to the consumption of hot water, and through application of predictive analytics, one may predict when hot water might be used and when that amount of hot water usage combined with measured power might result in cold water being drawn from the water heater. Through the system and method disclosed herein, a level of certainty is provided to that prediction surrounding a variety of charge states of the water heater. Specifically, the system and method disclosed herein may predict a fully hot charge state, whereby a monitor of the system knows that a consumer will receive hot water from the water heater, and that the water heater will not absorb more power; as a result, the monitor knows that with such state of charge, that particular water heater may be turned off in response to a load control instruction without any immediate impact on the consumer. Likewise, the system and method disclosed herein may predict a bottom cold/top hot charge state, whereby a monitor knows that a consumer will receive hot water from the water heater, but that there may not be much more than 15 gallons of hot water in the heater; as a result, the monitor knows that the water heater is in a middle state of charge and can be used for dispatch control (i.e., it will turn on and consume power when energized by the load controller, and will turn off when de-energized). Further, the system and method disclosed herein may predict a top cold/bottom cold charge state, evidencing a low state of charge with water dispensed at a lower temperature than desirable; as a result, a monitor knows that the unit should be heated to restore quality of service. Finally, the system and method disclosed herein may predict a top cold, bottom hot charge state, evidencing a transient state in which the water heater is generally fully hot, but the heater has lost energy through thermal loss through the top plumbing fittings, such that once energized, the unit will quickly return to a fully heated state; as a result, the monitor again knows that the water heater is in a middle state of charge and can be used for dispatch control (i.e., it will turn on and consume power when energized by the load controller, and will turn off when de-energized). Such predictability of various charge states of the water heater provides significant improvement over previously known methods and systems for using water heaters in load control environments, where one could predict only fully hot and not fully hot states.

Such system and method may thus provide good quality of service over longer periods of curtailment without risking delivering cold water from the water heater. Through analysis and application of the additional information that is monitored by the instant system and method, a monitor can confidently keep a water heater turned off that is known to have hot water at the top of the heater. Without the additional information provided by the system and method of the instant invention, a monitor of a load control system that includes water heaters must be very conservative and limit turn-off times to account for variability in usage—if a customer uses more hot water than predicted, they may not receive the service they expect. The refined monitoring and control of the instant invention avoids such unexpected detrimental effect to such a consumer's hot water service.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A system for monitoring hot water supply in a load control network, comprising:
   a multi-meter provided external to a water heater and having an electrical supply input and an electrical supply output to an electrical power supply circuit of said water heater, said multi-meter comprising:
      a voltage monitor configured to determine a voltage of said electrical power supply circuit;
      a current monitor configured to determine a current of said electrical power supply circuit; and
      a metering chip configured to determine which of an upper heating element of said water heater and a lower heating element of said water heater is presently energized based on one or more of said voltage of said electrical power supply circuit, said current of said electrical power supply circuit, and a power factor of said electrical power supply circuit;
   wherein said determination of which of said upper heating element and said lower heating element of said water heater is presently energized comprises determining a resistance of at least one of said upper heating element and said lower heating element based upon said one or more of said voltage of said electrical power supply circuit and said current of said electrical power supply circuit; and
   wherein said metering chip is further configured to record a first measured resistance as a resistance of said lower heating element based on a first one of said lower heating element and said upper heating element to be energized by said electrical power supply circuit.

2. The system of claim 1, wherein said metering chip comprises computer instructions configured to, upon determining that said upper heating element of said water heater is presently being energized, execute an instruction to prevent performance of a demand response curtailment instruction issued to said water heater.

3. The system of claim 1, wherein said metering chip comprises computer instructions configured to, upon determining that said lower heating element of said water heater is presently being energized, execute an instruction allowing performance of a demand response curtailment instruction issued to said water heater.

4. The system of claim 1, wherein said determination of which of said upper heating element and said lower heating element of said water heater is presently energized comprises determining a change of resistance in said electrical power control circuit in response to a changing power state of one of said upper heating element and said lower heating element.

5. The system of claim 1, wherein said determination of which of said upper heating element and said lower heating element of said water heater is presently energized comprises determining a change of power factor in said electrical power supply circuit in response to a changing power state of one of said upper heating element and said lower heating element.

6. The system of claim 1, wherein said metering chip is configured to record a second measured resistance as a resistance of said upper heating element based on a second one of said lower heating element and said upper heating element to be energized by said electrical power supply circuit.

7. The system of claim 6, wherein said metering chip is further configured to record temperatures of water in said water heater at differing times, and associate varied recorded temperatures with at least said first or said second measured resistances.

8. The system of claim 7, wherein said metering chip is further configured to determine a current temperature of said water in said water heater based upon a determination of a present resistance in said electrical power supply circuit.

9. A method for monitoring hot water supply in a load control network, comprising:
   providing a multi-meter external to a water heater and having an electrical supply input and an electrical supply output to an electrical power supply circuit of said water heater, said multi-meter comprising:
      a voltage monitor configured to determine a voltage of said electrical power supply circuit;
      a current monitor configured to determine a current of said electrical power supply circuit; and
      a metering chip configured to determine which of an upper heating element of said water heater and a lower heating element of said water heater is presently energized based on one or more of said voltage of said electrical power supply circuit, said current of said electrical power supply circuit, and a power factor of said electrical power supply circuit;
   receiving at said multi-meter a present voltage in said electrical power supply circuit;
   receiving at said multi-meter a present current in said electrical power supply circuit;
   determining at said multi-meter which of said upper heating element of said water heater and said lower heating element of said water heater is presently energized based on said present voltage and said present current;
   wherein said determining which of said upper heating element and said lower heating element of said water heater is presently energized further comprises determining at said multi-meter a resistance of at least one of said upper heating element and said lower heating element based upon said one or more of said voltage of said electrical power supply circuit and said current of said electrical power supply circuit; and
   recording at said multi-meter a first measured resistance as a resistance of said lower heating element based on a first one of said lower heating element and said upper heating element to be energized by said electrical power supply circuit.

10. The method of claim 9, further comprising: upon determining that said upper heating element of said water heater is presently being energized, preventing at said multi-meter performance of a demand response curtailment instruction issued to said water heater.

11. The method of claim 9, further comprising: upon determining that said lower heating element of said water heater is presently being energized, allowing at said multi-meter performance of a demand response curtailment instruction issued to said water heater.

12. The method of claim 9, wherein said determining which of said upper heating element and said lower heating element of said water heater is presently energized further comprises determining at said multi-meter a change of resistance in said electrical power control circuit in response to a changing power state of one of said upper heating element and said lower heating element.

13. The method of claim 9, wherein said determining which of said upper heating element and said lower heating element of said water heater is presently energized further comprises determining at said multi-meter a change of power factor in said electrical power supply circuit in response to a changing power state of one of said upper heating element and said lower heating element.

14. The method of claim 9, further comprising: recording at said multi-meter a second measured resistance as a resistance of said upper heating element based on a second one of said lower heating element and said upper heating element to be energized by said electrical power supply circuit.

15. The method of claim 14, further comprising: recording at said multi-meter temperatures of water in said water heater at differing times, and associating varied recorded temperatures with at least said first or said second measured resistances.

16. The method of claim 15, further comprising: determining at said multi-meter a current temperature of said water in said water heater based upon a determination of a present resistance in said electrical power supply circuit.

* * * * *